Patented Sept. 7, 1954

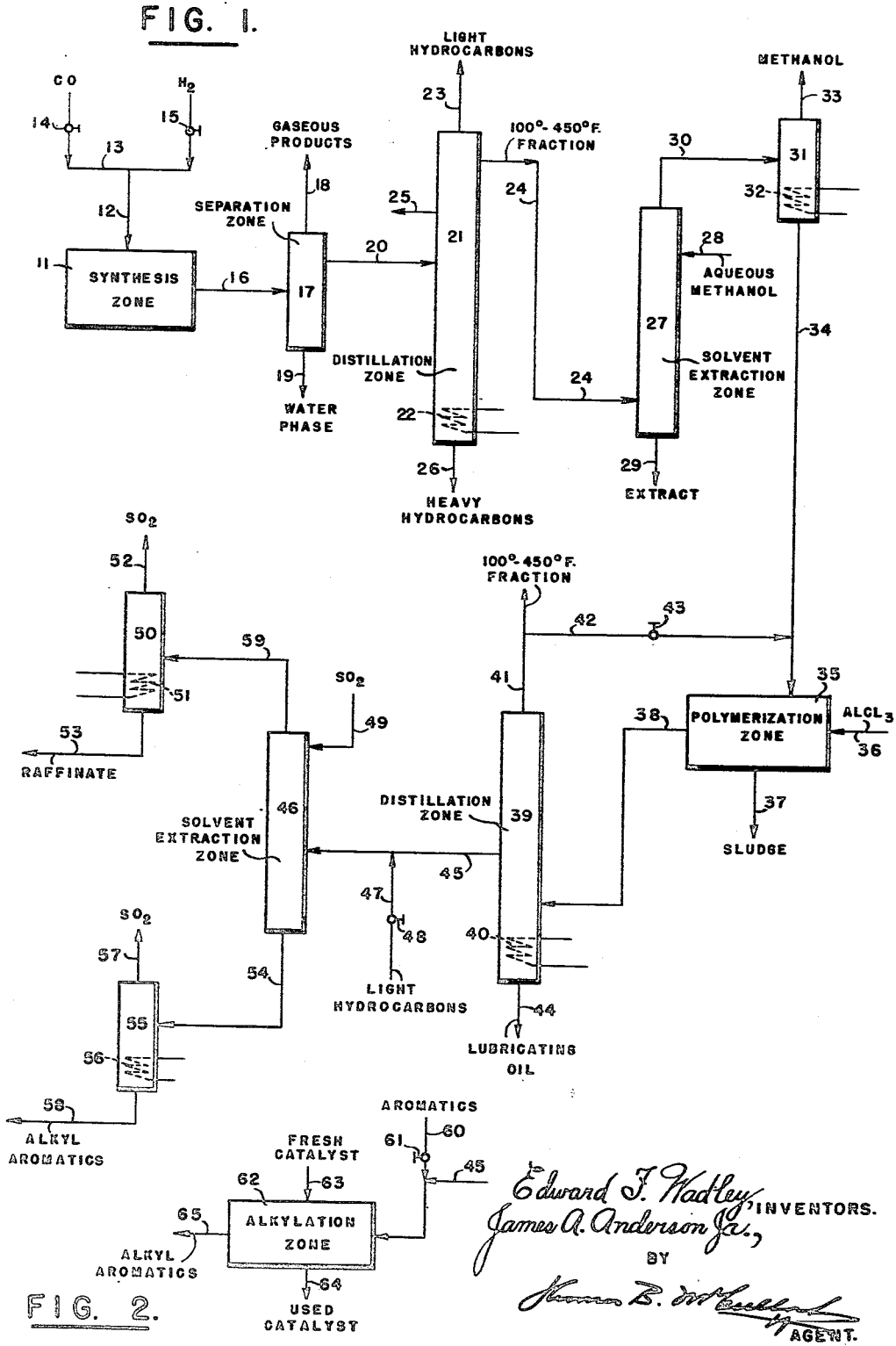

2,688,630

UNITED STATES PATENT OFFICE 2,688,630

TREATMENT OF THE HYDROCARBON SYNTHESIS PRODUCTS

Edward F. Wadley and James A. Anderson, Jr., Baytown, Tex., assignors, by mesne assignments, to Standard Oil Development Company, Elizabeth, N. J., a corporation of Delaware Application November 20, 1948, Serial No. 61,188

5 Claims. (Cl. 260—449.6)

The present invention is directed to a method for producing alkyl aromatics from olefinic hydrocarbon fractions containing aromatic hydrocarbons. More particularly, the invention is directed to the separation and recovery of alkyl aromatics from polymerized olefinic mixtures obtained from the polymerization of synthetic crude petroleum produced by contacting a feed mixture of carbon monoxide and hydrogen with a suitable catalyst under conversion conditions.

It has been known for at least twenty years that synthetic hydrocarbons can be produced by reacting a properly proportioned mixture of carbon monoxide and hydrogen with suitable catalysts. The catalysts finding use in prior art processes and the present invention include the iron catalysts either as the metals or as the oxides thereof. It has been customary to promote the activity of these catalysts by adding to the catalytic mass a small amount, ranging from about 0.2 to about 20% by weight, of an alkali promoter. The alkali promoters are usually the alkali metal hydroxides, carbonates, and oxides. The alkaline earth compounds such as calcium carbonate, calcium oxide, magnesium oxide, magnesium carbonate, strontium oxide, and strontium carbonate have also been employed. The alkali metal compounds include those of lithium, sodium, and potassium.

The temperatures employed in conducting the reaction of carbon monoxide and hydrogen over catalysts of the aforesaid types usually range from about 400° to about 700° F. with pressures ranging from about 100 to 500 pounds per square inch usually being employed. These conditions result in the formation of a product including hydrocarbons, both gaseous and liquid, oxygenated organic compounds such as organic acids, ketones, aldehydes, esters, and the like. By virtue of the complexity of the product including unreacted gaseous hydrocarbons, liquid hydrocarbons, and oxygenated organic compounds of the types mentioned before, separation of the product into its component parts has been a challenge to investigators throughout the years since the process was originated.

The hydrocarbons contained in the synthetic crude petroleum when an iron oxide catalyst has been employed under conditions such as those illustrated include olefinic hydrocarbons, paraffinic hydrocarbons, and other hydrocarbons and possibly naphthenes, etc. Recently it was discovered by us that besides the hydrocarbons of the aforesaid type, aromatic hydrocarbons are also included in the hydrocarbon product. It has now been further discovered that by a series of operational steps including polymerization, it is possible to produce and recover alkyl aromatics from the product produced in the aforesaid process.

It is, therefore, the main object of the present invention to provide a process whereby substantially pure alkyl aromatics are produced.

Another object of the present invention is to provide a method for recovering alkyl aromatics from polymers obtained by polymerizing synthetic naphthas formed by reacting carbon monoxide and hydrogen with iron-type catalysts.

The objects of the present invention are achieved by subjecting a polymer resulting from the polymerization of a substantially oxygen-free synthetic naphtha to a series of treating operations whereby alkyl aromatics are recovered in substantially purified form to the exclusion of other hydrocarbons.

In accordance with the present invention, a feed mixture of carbon monoxide and hydrogen in the proper proportions in the range from 1:1 to about 2:1 is contacted with an iron oxide catalyst promoted, for example, with potassium carbonate at a temperature in the range between 400° to 700° F. and a pressure in the range from 100 to 500 pounds per square inch to produce a product containing oxygenated organic compounds and hydrocarbons including olefins and aromatics. The product is separated into a gaseous phase, a liquid hydrocarbon phase, and an aqueous phase, the gaseous phase and aqueous phase being separately treated and recovered while the liquid hydrocarbon phase, in accordance with the present invention, is subjected to treatment with an aqueous alkaline solution to cause removal of organic acids, esters, and the like. This fraction, after treatment with an aqueous alkaline solution, is then distilled to recover a fraction boiling in the range from about 100° to 450° F. and including hydrocarbons having 5 carbon atoms in the molecule. This fraction is subjected to contact with a solvent selective for removal of alcohols, aldehydes, ketones, and the like. Such solvents include aqueous methanol solutions containing an amount of water in the range from 5 to 30 per cent by volume and methyl alcohol in the range from about 70 to 95 per cent by volume. The fraction boiling in the range between 100° to 450° F. is contacted at a temperature in the range from 60° to 120° F. with the aqueous methanol solution under conditions to cause formation of a raffinate phase which is substantially free of oxygenated organic compounds and an extract phase including oxygenated organic compounds and a major portion of the solvent. The extract phase may be treated for recovery of solvent and the dissolved oxygenated organic compounds while the raffinate phase is also freed of solvent and contacted with a suitable polymerization catalyst such as aluminum chloride which is preferred but other polymerization catalysts and especially the Friedel-Crafts catalysts may be used. As examples of other Friedel-Crafts catalysts may be mentioned ferric chloride, zirconium chloride, titanium tetrachloride, boron trifluoride, and the like. The fraction substantially free of oxygenated organic compounds is contacted with the polymerization catalyst under suitable polymerization conditions to cause formation of a polymer boiling above the boiling point of the fraction polymerized and including components boiling in the lubricating oil boiling range. The polymer and unreacted product are separated from the catalyst and distilled to recover a fraction boiling above the boiling point of the unreacted hydrocarbon and below the lubricating oil boiling range which is usually below 750° F. This fraction is subjected to a treating operation which may be solvent extraction with a selective solvent for removal of olefins or may include a catalytic conversion operation such as an alkylation operation whereby olefins contained in the selected fraction are caused to undergo an alkylation reaction to form alkyl aromatics. The product from the olefin treating operation then consists substantially of alkyl aromatics which may be recovered from the reagent selective for the removal of olefins.

The present invention thus embodies a series of operational steps in which alkyl aromatics are formed in a polymerization operation and are then separately recovered by virtue of the unique properties of the naphtha. The boiling ranges of the naphtha are so selected that the polymers recovered from the polymerization reaction contain substantially no paraffinic hydrocarbon. Thus, the paraffinic hydrocarbons are concentrated in the fraction boiling between 100° and 450° F. which is separated from the polymerized product.

The present invention will be further illustrated by reference to the drawing in which—

Fig. 1 is a flow diagram of a preferred embodiment of our invention; and

Fig. 2 is a flow diagram of a modification of the embodiment of Fig. 1.

Referring now to the drawing and particularly to Fig. 1, numeral 11 designates a synthesis zone into which is fed by line 12 connecting into manifold 13 a mixture of carbon monoxide and hydrogen in the proportions recited above. The carbon monoxide and hydrogen are introduced into manifold 13 by valves 14 and 15, respectively, connecting manifold 13 to sources of carbon monoxide and hydrogen, not shown.

Synthesis zone 11 is shown as a block in the diagram, but will be understood to include all auxiliary equipment necessary for such synthesis operation including contacting and separating equipment. It is also to be understood that synthesis zone 11 will include a synthesis operation of either the fixed bed, moving bed, or fluidized type and will include all auxiliary equipment to conduct such operations. A temperature in the range between 400° and 700° F. and a pressure in the range between 100 and 500 pounds per square inch are maintained in synthesis zone 11. Other suitable conditions of contact time are provided to cause the formation of a product including gaseous materials, unreacted feed, liquid hydrocarbons and oxygenated organic compounds. This product is separated from the catalyst in zone 11 and withdrawn by line 16 into a separation zone 17 wherein phase separation occurs and gaseous products are removed therefrom by line 18 and an aqueous phase is removed by line 19. Either or both of the gaseous products and the water phase may be recycled in part to the synthesis zone 11. However, it will be desirable to separate and recover valuable constituents in the gaseous product and in the water phase. For example, the water phase will include valuable oxygenated organic compounds of the type mentioned before.

The liquid hydrocarbon product is withdrawn from separation zone 17 by line 20 and may be subjected to treatment with an aqueous alkaline reagent in a treating zone, not shown, to cause removal of organic acids and esters therefrom. Such a treating reagent may include an aqueous solution of sodium hydroxide. The hydrocarbon is discharged by line 20 into a first distillation zone 21 which is provided with a heating means illustrated by coil 22 for adjustment of temperature and pressure and with lines 23, 24, 25, and 26.

Light hydrocarbons having less than five carbon atoms are removed overhead from distillation zone 21 by line 23 while hydrocarbons boiling between about 100° and 450° F. and including those having five carbon atoms in the molecule are withdrawn by line 24. Higher boiling hydrocarbons may be withdrawn by lines 25 and 26.

The hydrocarbon fraction boiling in the range from 100° to 450° F. is discharged by line 24 into a solvent extraction zone 27 wherein a separation is made between oxygenated organic compounds and hydrocarbons. Aqueous methanol, for example, is introduced into zone 27 by line 28 and flows downwardly countercurrently to the ascending hydrocarbon introduced by line 24. Other solvents selective for the removal of oxygenated organic compounds may be used in lieu of aqueous methanol such as water, sulfur dioxide, acetone, and acetic acid, but the alcoholic solutions give better results. Conditions are maintained in extraction zone 27 suitable for formation of an extract phase containing most of the solvent and the oxygenated organic compounds and a raffinate phase which consists substantially of hydrocarbons. The extract may be withdrawn from zone 27 by line 29 and further treated for recovery of the solvent and the dissolved oxygenated organic compounds while the raffinate is discharged by line 30 into a solvent stripper 31 which is equipped with a heating means illustrated by coil 32 for adjustment of temperature and pressure therein to cause removal by line 33 of solvent and recovery by line 34 of the substantially oxygenated organic compounds-free hydrocarbon fraction.

The hydrocarbon fraction which has been freed of oxygenated organic compounds is discharged by line 34 into a polymerization zone 35 which is illustrated by a rectangle in the diagram but will be understood to include all necessary contacting and separating equipment for polymerization of hydrocarbons. A Friedel-Crafts catalyst, such as aluminum chloride, may be introduced into zone 35 by line 36 and contacted with the hydrocarbon fraction therein. Conditions including temperatures in the range from about 50° to about 250° F. will be provided to cause polymerization of the olefinic hydrocarbons contained in the fraction discharged thereto by line 34. During the course of this polymerization reaction, it was observed, other reactions take place such as alkylation reactions between the olefins and the aromatics which have been discovered to be present in the product resulting from the contact of carbon monoxide and hydrogen with a catalyst of the type mentioned before. Under the aforesaid conditions, a polymer is produced boiling above the boiling point of the fraction discharged into zone 35 by line 34 and including lubricating oil constituents besides unreacted hydrocarbons. Used catalyst usually in the form of a sludge may be withdrawn from zone 35 by line 37. The product is discharged from zone 37 by line 38 which conducts the polymer into a second distillation zone 39. Distillation zone 39 is provided with a heating means illustrated by coil 40 for adjustment of temperature and pressure therein and to cause separation of the product into its component parts. There is withdrawn overhead from zone 39 by line 41 unreacted product boiling in the range between 100° to 450° F. which may be discharged from the system by line 41 but also may be recycled wholly or in part by branch line 42 controlled by valve 43 to line 34 and thence to zone 35. Lubricating oil fractions which are suitable for lubrication of machinery and boiling above about 750° F. are withdrawn from zone 39 by line 44. A fraction boiling between about 450° and 750° F. is withdrawn from zone 39 by line 45 and discharged thereby into a second solvent extraction zone 46 wherein the intermediate boiling fraction is contacted with a solvent selective for the removal of olefins from the aromatics contained in the fraction introduced thereto by line 45. It may be desirable to dilute the fraction introduced by line 45 into zone 46 with a light hydrocarbon such as a light paraffinic hydrocarbon. Provision is, therefore, made to inject into line 45 by line 47 controlled by valve 48 a light hydrocarbon such as a paraffinic hydrocarbon having from 5 to 8 carbon atoms in the molecule. The light hydrocarbon may be pentane, isopentane, a hexane, a heptane, or an octane. Usually, however, it will be desirable to employ as a diluent for the extraction a light hydrocarbon such as a pentane. Specifically, isopentane has given good results. The diluted intermediate boiling fraction is then contacted countercurrently in zone 46 with a solvent selective for the removal of olefins such as liquefied sulfur dioxide introduced into the top of zone 46 by line 49. Other solvents suitable for removing olefins from alkyl aromatics are sulfolanes, polyethylene glycols, phenol, aniline, nitrobenzene, and the like. Conditions are adjusted in zone 46 which usually will include a low temperature of the order of —10° to about —60° F. when sulfur dioxide is the solvent to cause the formation of a raffinate phase and an extract phase. The raffinate phase is withdrawn from zone 46 by line 59 and will include olefinic hydrocarbons contained in the fraction introduced into zone 46 from line 45. The raffinate is discharged into a solvent stripper 50 provided with a heating means illustrated by coil 51 to cause removal therefrom of solvent by line 52 which is recycled to zone 46. The raffinate including olefins may be withdrawn from zone 50 by line 53 for further processing or handling as may be desired.

The extract phase formed in zone 46 may be withdrawn therefrom by line 54 and discharged thereby into a second solvent stripper 55 which, similar to stripper 50, is provided with a heating means such as coil 56 to cause removal of solvent from the extract introduced thereto. The solvent is recovered from stripper 55 by line 57 and may be recycled to zone 46 while the extracted hydrocarbon including alkyl aromatics may be recovered by line 58. The alkyl aromatics boiling in the range from 450° to 750° F. may have exceptionally good properties for solvents for various organic material and also have properties which make them eminently suitable as feed stocks for the manufacture of synthetic detergents.

Referring now to the modification illustrated in Fig. 2, identical numerals will be employed to identify identical parts.

As an alternative procedure the fraction recovered from distillation zone 39 of Fig. 1 by line 45 need not be sent to solvent extraction zone 46 shown in Fig. 1, but instead may be admixed with a low boiling aromatic hydrocarbon having from 6 to 8 carbon atoms in the molecule which is introduced by line 60 controlled by valve 61 of Fig. 2 from a source not shown. An amount of low boiling aromatics is introduced by line 60 sufficient to provide an excess of aromatics over olefins contained in the fraction in line 45. The aromatics employed, as mentioned before, will have 6 to 8 carbon atoms and may include benzene, toluene, and the xylenes although benzene is preferred over the substituted benzenes. The mixture in line 45 is then discharged into an alkylation zone 62 which is provided with line 63 for introduction of an alkylation catalyst such as aluminum chloride thereto and line 64 for withdrawal of used alkylation catalyst from alkylation zone 62. Conditions including a temperature in the range between 50° and 150° F. are adjusted to cause an alkylation reaction to proceed between the aromatics and olefins. The catalyst employed in zone 62 ordinarily will be a Friedel-Crafts catalyst of the type illustrated above. The sludge withdrawn from zone 35 by line 37 after suitable fortification with aluminum chloride, if necessary, may be used as catalyst in zone 62.

Other conditions for alkylation of aromatic hydrocarbons with olefinic hydrocarbons besides the temperature ranges are well known and will not be given here. It will be understood, however, that conditions are adjusted in zone 62 to cause alkylation of the unreacted olefins contained in the fraction introduced by line 45 with the aromatics introduced by line 60. Thus, since the hydrocarbon mixture in line 45 consists substantially only of aromatics and olefinic hydrocarbons alkylation of the added aromatics with the olefinic hydrocarbons will leave a mixture consisting substantially of alkyl aromatics. This will include added aromatics having 6 to 8 carbon atoms in the molecule and the alkyl aromatics which are formed in zone 35. A mixture of alkyl aromatics and unreacted added aromatics may be withdrawn from zone 62 by line 65 and routed to a distillation zone, not shown, for separation between the unreacted aromatics and the alkyl aromatics. Thus, in accordance with this embodiment of our invention, it is possible to obtain a fraction consisting substantially of aromatics by adding low boiling aromatics thereto and causing the mixture to undergo an alkylation reaction.

As another alternative to our invention, instead of performing an alkylation reaction in zone 62, it may be possible to introduce thereto through line 63 a treating reagent such as strong sulfuric acid which is sufficiently strong to react with the olefinic hydrocarbons, but insufficiently strong to sulfonate the alkyl aromatics. However, rather than treat the olefins with sulfuric acid, it will be preferred to react the residual olefinic material with added aromatics to cause their conversion into alkyl aromatics since the olefins are then recovered as valuable product.

The process of the present invention is possible because of the peculiar nature of the product obtained when carbon monoxide and hydrogen are reacted over the catalyst of the type mentioned before. Thus, the paraffinic hydrocarbons are concentrated in the fraction boiling below 450° F. such that when the fraction is polymerized and subsequently distilled, the polymers contain substantially little, if any, paraffins. It is thus possible, in accordance with the present invention, to obtain polymers consisting substantially of lubricating oil fractions and intermediate fractions consisting substantially of alkylated aromatics.

The invention will be further illustrated by the following run in which a synthetic crude petroleum, obtained by contacting a mixture of carbon monoxide and hydrogen with a promoted iron oxide catalyst at a temperature in the range between 400° and 700° F. and a pressure in the range between 100 and 500 pounds per square inch, was distilled to obtain a fraction boiling between 160° and 450° F. This fraction was freed of oxygenated organic compounds and then polymerized in the presence of aluminum chloride at a temperature in the aforesaid polymerization range given. A product was formed including polymer boiling below and in the lubricating oil boiling range. This product was subjected to distillation to remove unreacted hydrocarbons boiling in the range between 160° and 450° F. and a polymer boiling below the lubricating oil boiling range boiling between 450° and 700° F. This latter fraction was blended with an equal volume of isopentane and the mixture was extracted at −40° F. with an equal volume of sulfur dioxide. As a result of this extraction an extract phase was obtained consisting substantially of alkyl aromatics. Analysis showed that the fraction contained 81.5% aromatics which had a Kauri-Butanol value of 73. The olefin content of the aromatics was 9.5% by volume. Aromatics of higher purity may be obtained by more efficient solvent extraction since only one stage was used in the aforementioned run. By employing several stages in the solvent extraction, it is possible to obtain substantially pure aromatic hydrocarbons.

The aforementioned fraction consisting substantially of 81.5 volume per cent aromatics was then analyzed by an infrared spectroscopic method. Study of the spectrum from this fraction indicates that it consisted substantially of di-substituted benzenes but also contained a substantial amount of mono-substituted benzenes. Furthermore, the spectrum indicated that the aromatics obtained from the 450° to 700° F. fraction of the polymer contained an appreciable quantity of ortho di-substituted benzenes and that the side chains are straight chains with very little, if any, branching. These properties indicate that the alkyl aromatics formed in accordance with our invention are suitable for sulfonation for the production of synthetic detergents.

The nature and objects of the present invention having been completely described and illustrated, what we wish to claim as new and useful and to secure by Letters Patent is:

1. In a method for producing alkyl aromatics which comprises forming a feed mixture of carbon monoxide and hydrogen in the ratio of 1:1 to 2:1, contacting said feed mixture at a temperature in the range between 400° and 700° F. and at a pressure in the range between 100 to 500 pounds per square inch with a promoted iron oxide catalyst to form a hydrocarbon product including olefinic and aromatic hydrocarbons, recovering said hydrocarbon product, distilling said hydrocarbon product to recover a fraction boiling in the range between 100° and 450° F., extracting said fraction with a solvent to remove substantally oxygenated organic compounds therefrom, polymerizing said extracted hydrocarbon fraction at a temperature in the range between 50° and 250° F. in the presence of an aluminum chloride catalyst to form a product including polymer boiling above 450° F. and unreacted hydrocarbon, the steps of distilling from said product unreacted hydrocarbon boiling below 450° F. and a fraction boiling above the boiling point of said unreacted hydrocarbon and below the boiling point of lubricating oil removing olefins from said fraction boiling above the boiling point of said unreacted hydrocarbon and below the boiling point of lubricating oil by contacting same with a treating reagent which will cause the selective removal of olefins to form a product consisting substantially of alkyl aromatics, and recovering said product.

2. In a method for producing alkyl aromatics which comprises forming a feed mixture of carbon monoxide and hydrogen in the ratio of 1:1 to 2:1, contacting said feed mixture with a promoted iron oxide catalyst at a temperature in the range between 400° and 700° F. and at a pressure between 100 and 500 pounds per square inch to form a hydrocarbon product including olefins and aromatics, recovering said hydrocarbon product, distilling said hydrocarbon product to separate a fraction boiling in the range between 100° and 450° F., extracting said distilled fraction with a solvent to cause substantial removal of oxygenated organic compounds, contacting said oxygenated organic compound-free fraction with an aluminum chloride catalyst at a temperature in the range between 50° and 250° F. under conditions to form a product including unreacted hydrocarbon, polymer boiling below the lubricating oil boiling range and in the lubricating oil boiling range, recovering said product, the steps of distilling said product to separate unreacted hydrocarbons boiling below 450° F. and to recover a first fraction boiling below 750° F. and above the boiling point of the unreacted hydrocarbon, extracting said first fraction with a solvent selective for the removal of olefins therefrom under conditions to form a raffinate phase and an extract phase, separately recovering said phases, and recovering alkyl aromatics from said extract phase.

3. A method in accordance with claim 2 in which the solvent is liquefied sulfur dioxide.

4. In a method for producing alkyl aromatics which comprises forming a feed mixture of carbon monoxide and hydrogen in the ratio of 1:1 to 2:1, contacting said feed mixture with a promoted iron oxide catalyst at a temperature in the range between 400° and 700° F. and at a pressure between 100 and 500 pounds per square inch to form a hydrocarbon product including olefins and aromatics, recovering said hydrocarbon product, distilling said hydrocarbon product to separate a first fraction boiling in the range between 100° and 450° F., extracting said first fraction with a solvent to cause substantial removal of oxygenated organic compounds, subjecting said oxygenated organic compound-free first fraction to contact with an aluminum chloride catalyst at a temperature in the range between 50° and 250° F. under conditions to form a product including unreacted hydrocarbon, polymer boiling below the lubricating oil boiling range and in the lubricating oil boiling range, recovering said product, the steps of distilling said product to separate unreacted hydrocarbons boiling below 450° F. and to recover a second fraction boiling below 750° F. and above the boiling point of the unreacted hydrocarbon, admixing said second fraction with a low boiling aromatic hydrocarbon having from 6 to 8 carbon atoms in the molecule to form an admixture containing an excess of aromatics, contacting said admixture with an alkylation catalyst under alkylation conditions at a temperature in the range between 50° and 150° F. to cause the formation of alkyl aromatics with said added aromatic, separating catalyst from said product, and recovering alkyl aromatics from said product.

5. A method in accordance with claim 4 in which the alkylation catalyst is aluminum chloride.

References Cited in the file of this patent

UNITED STATES PATENTS

| Number | Name | Date |
|---|---|---|
| 2,002,534 | Frolich | May 28, 1935 |
| 2,116,081 | Pier et al. | May 3, 1938 |
| 2,128,994 | Fischer | Sept. 6, 1938 |
| 2,193,799 | Atwell | Mar. 19, 1940 |
| 2,234,661 | Tramm | Mar. 11, 1941 |
| 2,257,074 | Goldsby | Sept. 23, 1941 |
| 2,330,054 | Hibshman | Sept. 21, 1943 |
| 2,456,119 | Friedman et al. | Dec. 14, 1948 |
| 2,457,146 | Grote et al. | Dec. 28, 1948 |
| 2,467,966 | Clark | Apr. 19, 1949 |
| 2,494,371 | Wadley | Jan. 10, 1950 |
| 2,542,516 | Heinrich | Feb. 20, 1951 |

OTHER REFERENCES

Haensel: "Kaiser Wilhelm Institute—Mulheim," P. B. 284 (1945). (16 pages; page 9 is pertinent.)

Golumbic: "Review of Fischer-Tropsch and Related Processes," Bureau of Mines I. C. 7,366 (1946). (24 pages; pages 21 and 22 are pertinent.)